G. L. PATTERSON.
BATTERY AND HOLDER.
APPLICATION FILED MAY 26, 1908.

983,760.

Patented Feb. 7, 1911.

2 SHEETS—SHEET 1.

Witnesses:

Inventor
G. L. PATTERSON
By his Attorneys

G. L. PATTERSON.
BATTERY AND HOLDER.
APPLICATION FILED MAY 26, 1908.
983,760.
Patented Feb. 7, 1911.
2 SHEETS—SHEET 2.
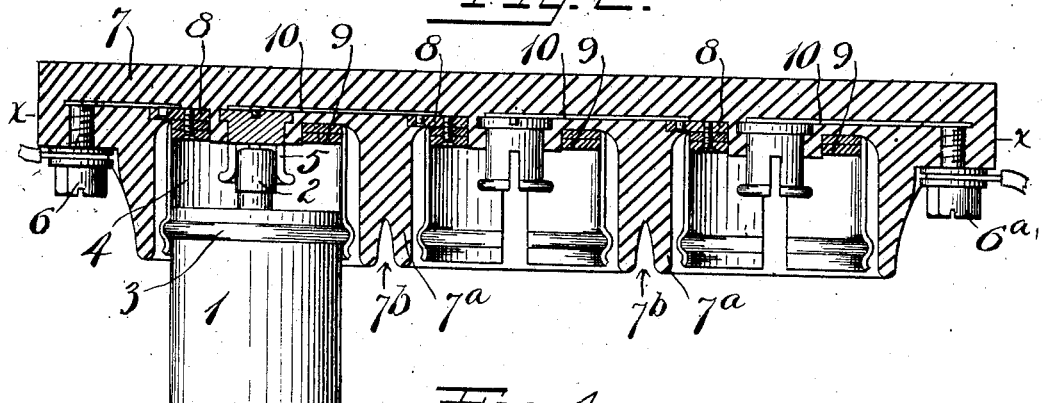
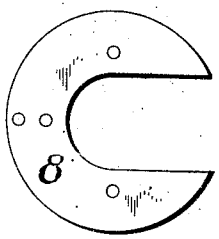
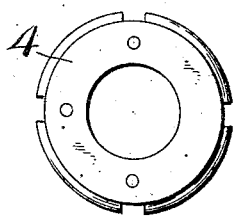
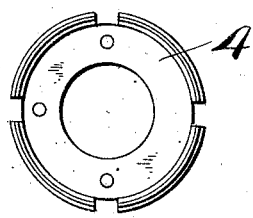
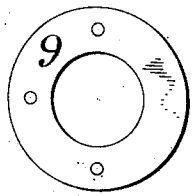
Witnesses:
Inventor
G. L. PATTERSON
By his Attorneys

UNITED STATES PATENT OFFICE.

GEORGE LEWIS PATTERSON, OF NEW YORK, N. Y., ASSIGNOR TO ALICE C. PATTERSON, OF NEW YORK, N. Y.

BATTERY AND HOLDER.

983,760. Specification of Letters Patent. Patented Feb. 7, 1911.

Application filed May 26, 1908. Serial No. 435,122.

*To all whom it may concern:*

Be it known that I, GEORGE L. PATTERSON, a citizen of the United States, residing at New York, N. Y., have invented certain new and useful Improvements in Batteries and Holders, of which the following is a full, clear, and exact description.

My invention relates to improvements in electric batteries and holders therefor, whereby said batteries may be quickly put into or out of circuit, a feature of great convenience where it is desired to substitute a fresh battery for an exhausted one.

The invention also comprehends an improved holding device to coact with the battery, the purpose being to avoid the necessity of any binding posts directly upon the battery.

The battery holder may be adapted to a single unit or a plurality of units, each battery cell representing a single unit.

Figure 1:
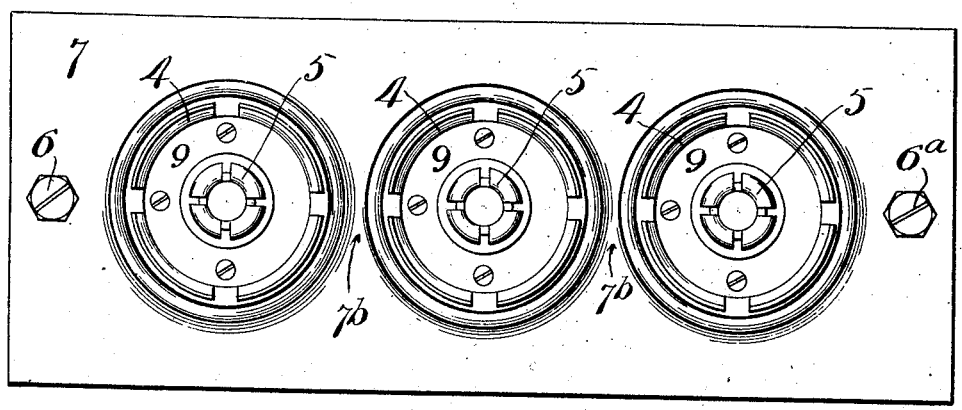
Figure 2:
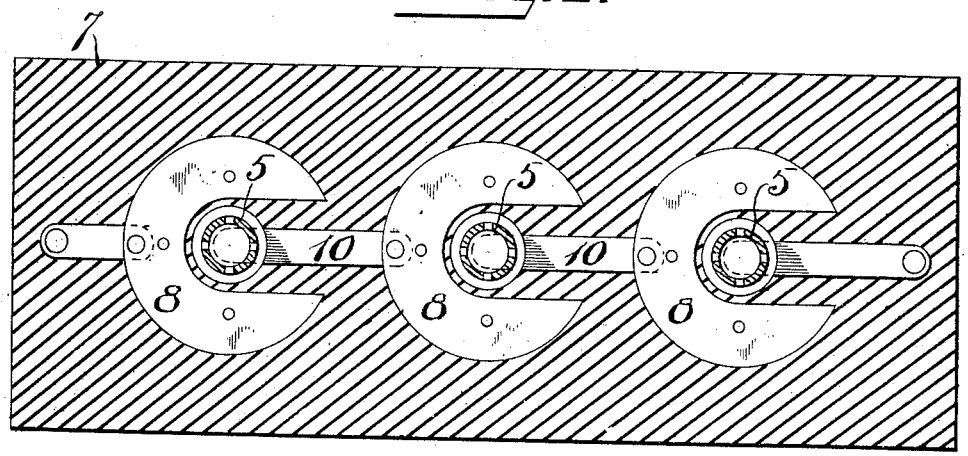

In the drawings Figure 1 is a view of the under side of a battery holder of the three-unit variety. Fig. 2 is a longitudinal section of the same. Fig. 3 is a section of the holder on the plane of the line *x*—*x* of Fig. 2. Fig. 4 is a plan view of a detail termed the bed plate. Fig. 5 is a view of the upper side of one of the clips, detached. Fig. 6 is a view of the under side of the same clip. Fig. 7 is a view of a retaining washer and reinforcing plate.

1 represents the main body of a battery cell of the ordinary dry battery type. 2 represents the central electrode projecting from one end thereof.

3 is a shoulder on the side of the body 1, preferably in the form of a projecting rib, although the shoulder might be formed by mere reversal, causing said rib to be formed on the inner side of the body 1 by grooving the outer side. This modification is too obvious to require illustration.

4 represents a socket of suitable outline, and size to receive the main body 1 of the clip. The side wall of the socket 4 may be split to make the same yielding, and parts of said yielding side wall are shaped to engage the shoulder 3 of the battery cell when the latter is forced into the socket. 5 is a second socket, also preferably split, as indicated in Fig. 2, said socket 5 being designed to receive the electrode 2 of the battery cell.

6—6ª are binding posts carried by the battery holder 7. This battery holder may be of any suitable form and is preferably formed of insulating material, having suitable cavities therein to receive and hold the sockets 4—5. In this instance three sets of such sockets are provided for the reception of three units. These sockets are electrically connected in series, the binding posts 6—6ª being the end terminals. It is unnecessary to describe at length the connection of the sockets one with another, it being merely sufficient to state that the socket adapted to the positive pole of one battery is electrically connected with the socket adapted to the negative pole of the next adjacent battery.

8 is a bed plate of U-shaped outline, which is suitably anchored in the holder 7, so as to be permanently connected therewith. The socket 4 rests directly upon the base plate 8, while a reinforcing washer 9 located within the socket 4 receives the heads of fastening screws or rivets which pass through the washer and socket and make a suitable connection with the base plate, firmly securing the socket thereto and in effective electrical connection therewith, the large area of said connection having a large current carrying capacity. The socket 5 passes through the space within the bed plate 8 and washer 9 without contact with the same, the clearance space being preferably filled with insulating material, as indicated in the drawings, although this is not absolutely essential.

10 is a connecting strip passing from the base of the socket 5 through the open side of the bed plate 8 and making electrical connection with the larger of the two sockets in the next series, as best seen in Figs. 2 and 3. This electrical connector 10 may be embedded within the holder 7 so as to be effectively insulated, although this is not absolutely essential. Each socket 3 is preferably spaced apart from the other by a wall of insulation, as indicated at 7ª, while a groove therein, indicated at 7ᵇ, guards against short-circuiting by creeping salts or moisture collected by condensation.

From the foregoing it is apparent that each battery 1 may be quickly and effectively introduced into the circuit in which the sockets 4—5 represent opposed terminals adapted respectively to the opposed terminals of the battery proper and arranged to automatically receive, retain and electrically connect the same by the single act of forcing the cell into place. By this improved construction the holder alone may be provided with the binding posts, and hence, since the holder may be permanently secured in place and the electrical connections of the main circuit wires made permanently with the binding posts, it is but the work of an instant to replace an old battery with a fresh one. So also a distinct advantage is gained in a holder adapted to receive a plurality of cells, since at any instant any one of said cells may be quickly removed and a fresh one substituted.

What I claim is:

1. In a combined battery and holder therefor, a battery cell having an external holding shoulder, a socket having a yielding wall adapted to engage said holding shoulder, a second socket coöperating with the first and arranged to engage another part of said battery, both of said sockets being resilient to receive said cell and a laterally projecting connector member extending from the first mentioned socket.

2. An electrical conductor for electric cells comprising a circular base having depending, spring, cell engaging fingers or clips, a conducting member having a resilient portion extending laterally from said base, the outer end of said member extending below the plane of said base and arranged to engage a portion of an adjacent cell.

3. A battery holder for electric cells comprising a frame or support, a series of cell connectors carried thereby, one of said connectors including an annular conductor plate having a series of cell engaging spring fingers projecting therefrom, and a resilient connector in electrical connection therewith, the outer end of which extends into and lies within the open center of an adjacent conductor plate.

GEORGE LEWIS PATTERSON.

Witnesses:
R. C. MITCHELL,
R. C. POWELL.